Oct. 11, 1960     G. F. HAUSMANN     2,955,414
COMBINED POWER PLANT

Filed Sept. 3, 1957                         2 Sheets-Sheet 1

INVENTOR
GEORGE F. HAUSMANN
BY
ATTORNEY

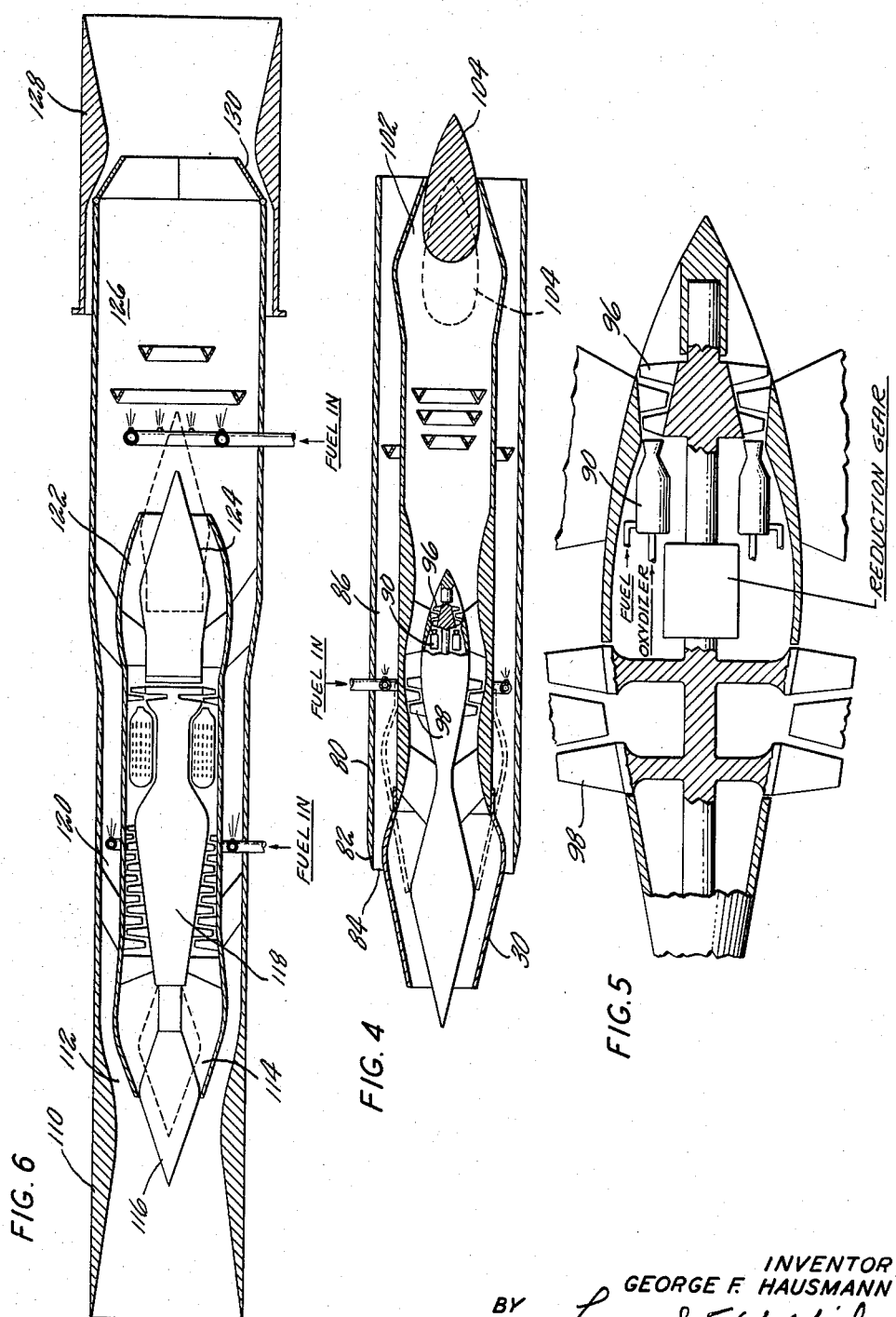

United States Patent Office 2,955,414
Patented Oct. 11, 1960

2,955,414

COMBINED POWER PLANT

George F. Hausmann, Glastonbury, Conn., assignor to United Aircraft Corporation, East Hartford, Conn., a corporation of Delaware Filed Sept. 3, 1957, Ser. No. 681,554

8 Claims. (Cl. 60—35.6)

This invention relates to combined power plants and more particularly to power plants having common air inlet configurations.

In the application of air breathing propulsion systems to flight over wide ranges of subsonic and supersonic flight speeds, different power plant types are generally required to obtain efficient propulsion for each regime of operation. The independent installation of different power plant types on an aircraft necessarily presents severe compromises in aircraft performance because of the additional weight and drag required by separate installations.

It is thus an object of this invention to provide a combined power plant which includes a common inlet adaptable to either of the two power plant elements of the combination.

It is a further object of this invention to provide an inlet of the type described which results in a net reduction in weight and/or drag.

It is another object of this invention to provide a combined power plant of the type described which may have specific primary elements and may have separate or common exhaust nozzles.

These and other objects of this invention will become readily apparent from the following detailed description of the drawings in which:

Fig. 4 is a cross-sectional illustration of a modified power plant;

Fig. 5 is an enlarged detailed illustration of the rocket combustion chamber and turbine of the turbojet portion of Fig. 4; and Fig. 6 is a cross-sectional illustration of still another modification of this invention.

Figure 1:
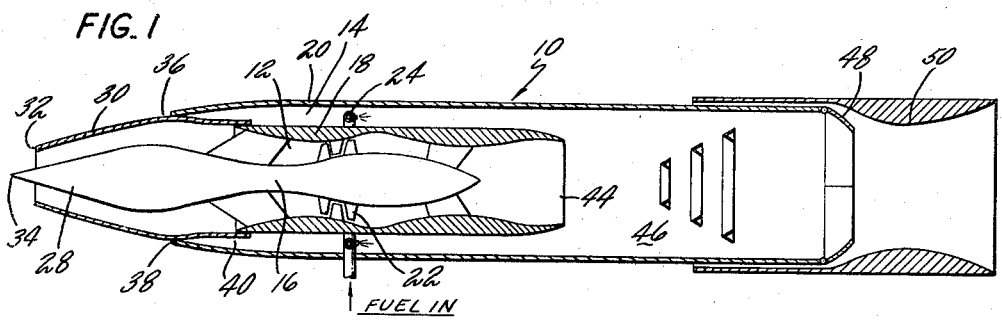
Fig. 1 is a cross-sectional schematic illustration of a combined turbojet-ramjet power plant with the turbojet in the operative position.

Referring to Fig. 1 a combined power plant is generally indicated at 10 which includes a central main duct 12 and an outer annular duct 14. The duct 12 is formed by an inner body 16 and the wall 18. The outer annular duct 14 is defined by the wall 18 and the surrounding outer wall or casing 20. The duct 12 contains a turbojet power plant having a compressor section 22 which may be driven by any suitable turbine or by the rocket driven turbine of Fig. 5. The outer annular duct 14 may have fuel injected therein by means 24 so that the outer annular duct may operate as a ramjet.

The central body 16 includes an upstream spike or conical portion 28 which is surrounded by a movable cowl 30. In the position shown the cowl 30 has its leading edge 32 slightly aft of the leading edge 34 of the spike 28. In addition, the point of maximum divergence 36 of the cowl 30 is in juxtaposed relation with the leading edge lip 38 of the outer wall 20, thereby closing off the inlet 40 to the duct 14. In this position the usual subsonic inlet having a shallow cowl angle is receiving air from the airstream to supply the compressor 22 of the turbojet. As shown herein, the turbojet has an exhaust 44 which emits gases into a common afterburner 46. Thus, the afterburner 46 can be used either for the turbojet operation or for the ramjet operation. In either case a variable area nozzle 48 receives gases from the afterburner 46 and forms a part of a convergent-divergent nozzle 50.

Figure 2:
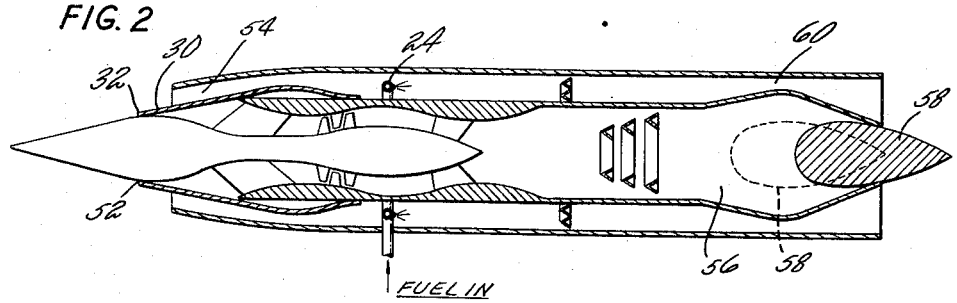
Fig. 2 is similar to Fig. 3 but illustrates the turbojet as being inoperative and the ramjet being in operation.

As seen in Fig. 2, when the cowl 30 is moved to its aft position, its leading edge 32 is in juxtaposed relation with the point 52 of maximum divergence of the conical section 28. In this position a streamlined central body is presented to the airstream and an internal converging-diverging compression inlet 54 is provided for the outer annular ramjet operation. Fig. 2 also differs from Fig. 1 in that the turbojet power plant has its exhaust nozzle 56 extending the complete length of the power plant. With such a configuration a streamlined plug 58 may be provided in the exhaust nozzle 56 and can be moved to the position shown by any suitable mechanism so that the turbojet power plant is completely closed off at its forward and aft ends. The exhaust plug may be moved for example as shown in Patent No. 2,540,594 issued to N. C. Price on February 6, 1951. With such a configuration the exhaust from the outer annular ramjet exhausts through a separate convergent-divergent nozzle 60.

Figure 3:
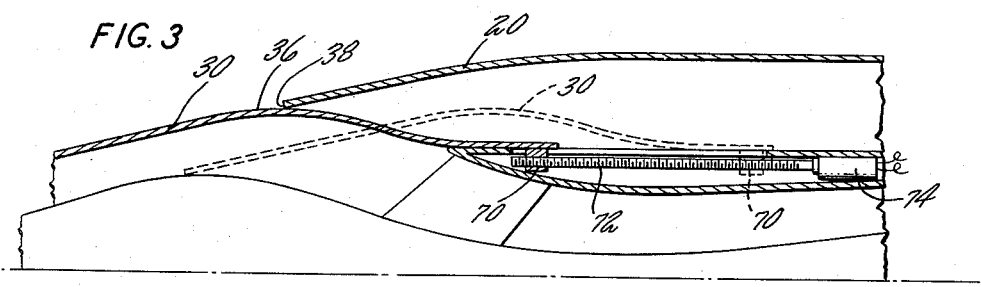
Fig. 3 is an enlarged detailed illustration of the mechanism for moving the inlet cowl of Figs. 1 and 2.

Fig. 3 illustrates a typical mechanism for moving the cowl 30 from its extreme forward to its extreme aft end. For this purpose the cowl 30 may include a nut 70 which is adapted to be moved along a screw thread 72 driven by any suitable electric motor 74. Thus, the cowl 30 may be moved between a full line to a dotted line position as illustrated.

As best seen in Fig. 3 the point of maximum divergence 36 of a cowl 30 is in a juxtaposed or engaged position with the leading edge 38 of the outer casing or wall 20 of the power plant. In this position the forward portion of the wall 20 presents a curved configuration to the oncoming stream. As a result there will be some external drag imposed on the particular vehicle. Where this drag is not acceptable, it may be desirable to make the leading edge of the outer casing substantially straight as shown in Fig. 4. As seen herein, the outer wall 80 of the power plant has a leading edge 82 which presents a substantially straight line to the oncoming airstream. Under these conditions the movable cowl 30 in its forward position will not be in juxtaposed relation with the leading edge 82 of the outer wall 80 but will permit at least a small amount of air to pass through the opening 84 at all times. Thus, in its forward position when the central turbojet power plant is being operated, a small amount of air will always be passing through the outer annular ramjet duct 86. Under these conditions the external drag of the power plant will be reduced since there is no curved outer surface in the region 82 which is exposed to the oncoming stream.

For different conditions of operation it may be desirable to have the turbine portion of the turbojet power plant driven by a rocket type combustion chamber. As seen in Figs. 4 and 5 a rocket combustion chamber 90 has a fuel and oxidizer or a monofuel fed thereto and the combustion gases are emitted through one or more nozzles 94 and are discharged through the turbine 96. The turbine 96 in turn drives a compressor 98. The fuel-rich discharge gases from the turbine and the air from the compressor may be mixed and burned in an afterburner 100 (Fig. 4) and discharged through a convergent-divergent nozzle 102. As shown herein, the nozzle 102 may include a streamlined plug 104 which may be movable between the full and dotted line positions shown.

Fig. 6 shows another modification of this invention with a fixed convergent-divergent inlet 110 which may be perforated if desired. The inlet may be of the type shown and described in my patent application Serial No. 336,746, filed February 13, 1953, now Patent No. 2,861,419. The inlet 110 leads to an outer annular duct 112 and a central duct 114. A streamlined spike or plug 116 is movable between the full and dotted line positions so as to close off or open the inlet 114 depending on whether the turbojet power plant 118 is operating. As shown herein, the turbojet power plant 118 may discharge through a convergent nozzle 122 which may be opened or closed by means of a movable central plug 124. As shown herein, in a manner similar to Fig. 1, the gases from both the annular ramjet 120 and the turbojet 118 may discharge into a common afterburner 126. Here again the afterburner 126 exhausts into a convergent-divergent nozzle 128 which may include as a part thereof a variable area portion 130.

It is thus apparent that as a result of this invention a combined power plant arrangement has been provided with a common lightweight inlet configuration.

Although several embodiments of this invention have been illustrated and described herein, it will become apparent that various changes and modifications may be made in the construction and arrangement of the parts without departing from the scope of this novel concept.

What is desired by Letters Patent is:

1. In combination, means defining a main central duct having an outer wall, said wall having a leading edge, a streamlined body located centrally of said central duct, said body having an upstream spike portion which diverges and then converges in a downstream direction, said spike portion being located upstream of said duct wall leading edge, a cowl surrounding said central duct wall edge, a cowl surrounding said central duct at the leading edge thereof and with said spike forming at the leading edge thereof and with said spike forming a forward facing inlet, said cowl having a leading edge, means for moving said cowl axially relative to said spike, said cowl in its forward position having its leading edge adjacent the leading edge of said spike along the longitudinal axis of said duct, and said cowl having its leading edge in contact with the maximum divergent section of said spike when said cowl is in the aft position to close off said central duct, and means defining an outer coaxial duct surrounding said central duct and forming with said cowl a second forward facing inlet, said outer duct being at least partially closed off by said cowl when said cowl is in its forward position, and means for burning fuel in said outer duct.

2. In a combination power plant, means defining a main central duct having an outer wall, said wall having a leading edge, a streamlined body located centrally of said central duct, said body having an upstream spike portion which diverges and then converges in a downstream direction, said spike portion being located upstream of said duct wall leading edge, a cowl surrounding the upstream end of said central duct and forming a forward facing inlet with said central body, said cowl having a leading edge and having a substantially small angle of divergence in a downstream direction, means for moving said cowl axially relative to said duct, said cowl in its forward position having its leading edge adjacent the leading edge of said spike relative to the longitudinal axis of said main duct, and said cowl having its leading edge in contact with the maximum divergent section of said spike when said cowl is in the aft position to close off said central duct, means defining an outer coaxial duct surrounding said central duct and forming therewith a forward facing inlet, a compressor and a turbine for driving the compressor located downstream of said inlet and in said central duct, means including a combustion section between said compressor and turbine, for introducing fuel into the power plant to mix with the gases exhausting from the downstream end of at least one of said ducts, and means including a combustion section for burning said gases.

3. In a combustion power plant, means defining a main central duct having an outer wall, said wall having a leading edge, a streamlined body located centrally of said central duct, said body having an upstream spike portion which diverges and then converges in a downstream direction, said spike portion being located upstream of said duct wall leading edge, a cowl surrounding the upstream end of said central duct and forming an inlet with said central body, said cowl having a leading edge and having a substantially small angle of divergence in a downstream direction, means for moving said cowl axially relative to said duct, said cowl in its forward position having its leading edge adjacent the leading edge of said spike relative to the longitudinal axis of said main duct, and said cowl having its leading edge in contact with the maximum divergent section of said spike when said cowl is in the aft position to close off said central duct, means defining an outer coaxial duct surrounding said central duct, said outer duct having an upstream forward facing inlet diverging in a downstream direction and engaging the maximum diameter of said cowl when the cowl is in its forward axial position to close said outer duct, a compressor and a turbine for driving the compressor located downstream of said inlet and in said central duct, including a combustion section between said compressor and turbine, a ramjet power plant in said outer duct, a streamlined plug within the aft end of said inner duct, means for moving said plug in an aft direction to close off said inner duct and form a streamlined converging continuation of the wall of said inner duct.

4. In a combination power plant, means defining a main central inner duct having an outer wall, said wall having a leading edge, a streamlined body located centrally of said central duct, said body having an upstream spike portion which diverges and then converges in a downstream direction, said spike portion being located upstream of said duct wall leading edge, a cowl surrounding said inner central duct and forming an inlet with said central body, said cowl having a leading edge and having walls diverging and then converging in a downstream direction, means for moving said cowl axially relative to said duct, said cowl in its forward position having its leading edge adjacent to but aft of the leading edge of said spike, and said cowl having its leading edge in contact with the maximum divergent section of said spike when said cowl is in the aft position to close off said inner central duct and to present a smooth exterior flow surface, means defining an outer coaxial duct surrounding said inner central duct and having a forward facing inlet, said outer duct being closed off by said cowl when said cowl is in its forward position whereby the point of maximum divergence of said cowl engages said outer duct adjacent its leading edge, a turbine type power plant in one of said ducts, and a ramjet type power plant in the other of said ducts.

5. In a power plant according to claim 4 including an afterburner receiving the flow from both said ducts.

6. In a power plant according to claim 4 wherein said central duct terminates in a converging downstream end, a streamlined plug movable within said downstream end and movable to an upstream position to open said downstream end and also movable to a downstream position to close off said downstream end, said plug in the downstream position forming a streamlined extension of the downstream end of said central duct and together therewith defining a diverging passage in cooperation with said outer duct.

7. A combined power plant including means defining a central duct having an upstream outer cowl member which has a diverging-converging geometry in a downstream direction, a streamlined plug member in said duct and cooperating with said cowl to define a forward facing inlet opening, means for relatively moving one of said members with respect to the other to vary the area of said opening, a compressor in said duct downstream of said opening, a combustion section, a turbine receiving fluids from said combustion section, said turbine driving said compressor, means defining an annular duct surrounding said central duct including an upstream portion cooperating with said cowl member to define an outer forward facing annular inlet, and said outer inlet being closed when said cowl member is in a relatively forward position with respect to said plug member and open when said cowl member is in a relatively rearward position with respect to said plug member, said cowl member and outer duct forming convergent-divergent annular inlet when said cowl member is in rearward position.

8. In a combination power plant including means defining a central duct, said central duct having a convergent-divergent inlet, said inlet being formed by a divergent-convergent spike member surrounded by a cooperating cowl member, a compressor in said duct, a combustion section downstream of said compressor, a turbine receiving fluid from said combustion section and driving said compressor, a convergent-divergent nozzle receiving fluid from said turbine, means for closing the opening of said inlet comprising means for relatively moving one of said members with respect to the other, means for closing said nozzle, means defining an annular duct receiving air from the airstream and surrounding said central duct, the leading edge of said annular duct forming with said cowl a forward facing inlet, means for introducing fuel into said annular chamber whereby it operates as a ramjet at high Mach numbers of relative air flow, a convergent-divergent nozzle at the downstream end of said annular duct, and means for varying the area of said nozzle.

References Cited in the file of this patent
UNITED STATES PATENTS

| | | |
|---|---|---|
| 2,557,435 | Imbert | June 19, 1951 |
| 2,596,435 | Robert | May 13, 1952 |
| 2,610,465 | Imbert et al. | Sept. 16, 1952 |
| 2,641,324 | Fortescue | June 9, 1953 |
| 2,641,902 | Kerr | June 16, 1953 |
| 2,696,078 | Waitzman | Dec. 7, 1954 |
| 2,716,329 | Lunger | Aug. 30, 1955 |
| 2,798,360 | Hazen et al. | July 9, 1957 |
| 2,896,408 | O'Donnell | July 28, 1957 |

FOREIGN PATENTS

| | | |
|---|---|---|
| 749,009 | Great Britain | May 16, 1956 |
| 749,767 | Great Britain | May 30, 1956 |
| 761,235 | Great Britain | Nov. 14, 1956 |
| 140,860 | Sweden | June 16, 1953 |